United States Patent
Ali et al.

(10) Patent No.: US 11,453,417 B2
(45) Date of Patent: Sep. 27, 2022

(54) AUTOMATED DRIVING CONTROL SYSTEMS AND METHODS BASED ON INTERSECTION COMPLEXITY

(71) Applicant: GM GLOBAL TECHNOLOGY OPERATIONS LLC, Detroit, MI (US)

(72) Inventors: Kamran Ali, Troy, MI (US); Donald K. Grimm, Utica, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 48 days.

(21) Appl. No.: 17/110,788

(22) Filed: Dec. 3, 2020

(65) Prior Publication Data

US 2022/0177006 A1    Jun. 9, 2022

(51) Int. Cl.
| | |
|---|---|
| *B60W 30/18* | (2012.01) |
| *B60W 60/00* | (2020.01) |
| *B60W 40/06* | (2012.01) |
| *B60W 50/00* | (2006.01) |

(52) U.S. Cl.
CPC .. *B60W 60/0059* (2020.02); *B60W 30/18159* (2020.02); *B60W 40/06* (2013.01); *B60W 60/0053* (2020.02); *B60W 2050/0075* (2013.01); *B60W 2420/403* (2013.01); *B60W 2555/20* (2020.02); *B60W 2556/10* (2020.02); *B60W 2556/50* (2020.02)

(58) Field of Classification Search
CPC ....... B60W 60/0059; B60W 30/18159; B60W 40/06; B60W 60/0053; B60W 2050/0075; B60W 2420/403; B60W 2555/20; B60W 2556/10; B60W 2556/50
See application file for complete search history.

(56) References Cited

U.S. PATENT DOCUMENTS

| | | | |
|---|---|---|---|
| 10,331,141 B2 | 6/2019 | Grimm et al. | |
| 10,745,006 B2 | 8/2020 | Grimm et al. | |
| 2017/0356747 A1* | 12/2017 | Iagnemma | G05D 1/0088 |
| 2018/0059669 A1* | 3/2018 | Madigan | G08G 1/04 |
| 2021/0004012 A1* | 1/2021 | Marchetti-Bowick | |
| | | | G05D 1/0088 |

FOREIGN PATENT DOCUMENTS

JP     H06131046 A  *  5/1994

OTHER PUBLICATIONS

Nagaya Toshio, May 13, 1994, English Machine Translation_ JPH06131046A provided by Patent Translate by EPO and Google (Year: 1994).*

* cited by examiner

*Primary Examiner* — Peter D Nolan
*Assistant Examiner* — Ashley L Redhead, Jr.

(57) ABSTRACT

An intersection navigation system includes: a complexity module configured to determine a complexity value for an intersection of two or more roads, where the complexity value for the intersection corresponds to a level of complexity for a vehicle to navigate the intersection during autonomous driving; and a driving control module configured to: during autonomous driving of a vehicle, control at least one of: steering of the vehicle; braking of the vehicle; and acceleration of the vehicle; and based on the complexity value of the intersection, selectively adjust at least one aspect of the autonomous driving.

20 Claims, 7 Drawing Sheets

AUTOMATED DRIVING CONTROL SYSTEMS AND METHODS BASED ON INTERSECTION COMPLEXITY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods for determining intersection complexity and controlling autonomous vehicle operation.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver.

Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

In a feature, an intersection navigation system includes: a complexity module configured to determine a complexity value for an intersection of two or more roads, where the complexity value for the intersection corresponds to a level of complexity for a vehicle to navigate the intersection during autonomous driving; and a driving control module configured to: during autonomous driving of a vehicle, control at least one of: steering of the vehicle; braking of the vehicle; and acceleration of the vehicle; and based on the complexity value of the intersection, selectively adjust at least one aspect of the autonomous driving.

In further features, the driving control module is configured to, based on the complexity value of the intersection, selectively adjust a route of the vehicle.

In further features, the driving control module is configured to, when the complexity value of the intersection is greater than a predetermined value, remove the intersection from the route.

In further features, the driving control module is configured to, based on the complexity value of the intersection, selectively disable the autonomous driving and trigger manual driving by a driver of the vehicle.

In further features, the driving control module is configured to, when the complexity value of the intersection is greater than a predetermined value, selectively disable the autonomous driving and trigger manual driving by the driver of the vehicle.

In further features, the driving control module is configured to, based on the complexity value of the intersection, selectively disable the autonomous driving and trigger driving of the vehicle by a driver that is remote from the vehicle.

In further features, the driving control module is configured to, when the complexity value of the intersection is greater than a predetermined value, selectively disable the autonomous driving and trigger driving of the vehicle by the driver that is remote from the vehicle.

In further features, the driving control module is configured to, based on the complexity value of the intersection, adjust at least one aspect of sensor fusion.

In further features, the driving control module is configured to, when the complexity value of the intersection is greater than a predetermined value, adjust at least one aspect of the sensor fusion.

In further features, the complexity module is configured to determine the complexity value of the intersection based on sensing capabilities of the vehicle.

In further features, the sensing capabilities of the vehicle include numbers and types of external cameras and sensors of the vehicle.

In further features, the complexity module is configured to determine the complexity value of the intersection based on whether the vehicle will proceed straight through the intersection, turn right at the intersection, or turn left at the intersection.

In further features, the complexity module is configured to determine the complexity value of the intersection based on historical data for accidents at the intersection.

In further features, the historical data for accidents at the intersection includes a number of accidents at the intersection within a predetermined period.

In further features, the complexity module is configured to determine the complexity value of the intersection based on a geographical feature of the intersection.

In further features, the complexity module is configured to determine the complexity value of the intersection based on topography of the intersection.

In further features, the complexity module is configured to determine the complexity value of the intersection based on a second complexity value of the intersection received from a second vehicle.

In further features, the complexity module is configured to determine the complexity value of the intersection based on present weather at the intersection.

In further features, the complexity module is configured to determine the complexity value of the intersection based on present traffic at the intersection.

In a feature, an intersection navigation method includes: determining a complexity value for an intersection of two or more roads, where the complexity value for the intersection corresponds to a level of complexity for a vehicle to navigate the intersection during autonomous driving; during autonomous driving of a vehicle, controlling at least one of: steering of the vehicle; braking of the vehicle; and acceleration of the vehicle; and based on the complexity value of the intersection, selectively adjusting at least one aspect of the autonomous driving.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include one or more cameras and/or one or more sensors that can be used for autonomous driving and one or more other features. A control module may determine whether to perform or disable autonomous driving.

Navigating intersections may be a more difficult task for autonomous vehicles. For example, intersections have different types of traffic lights, different turning possibilities, different pedestrian crossings, different traffic flow patterns, etc. The differences between intersections makes autonomous navigation of intersections even more difficult.

The present application involves determining complexity values for intersections, respectively, for a vehicle. The complexity value of an intersection may correspond to a level of complexity for the vehicle to navigate the intersection autonomously.

One or more actions may be taken based on the complexity level of an intersection. For example, intersections with some complexity values may be omitted from a route of the vehicle such that the vehicle avoids attempting to traverse the intersection autonomously. As another example, for intersections with some complexity values, remote driving or manual driving by the driver may be triggered to navigate those intersections. As another example, computational and/or sensing resources may be adjusted for intersections with some complexity values as to allow the vehicle to successfully autonomously navigate those intersections. The complexity values of intersections increase the likelihood of successful intersection navigation.

Figure 1:
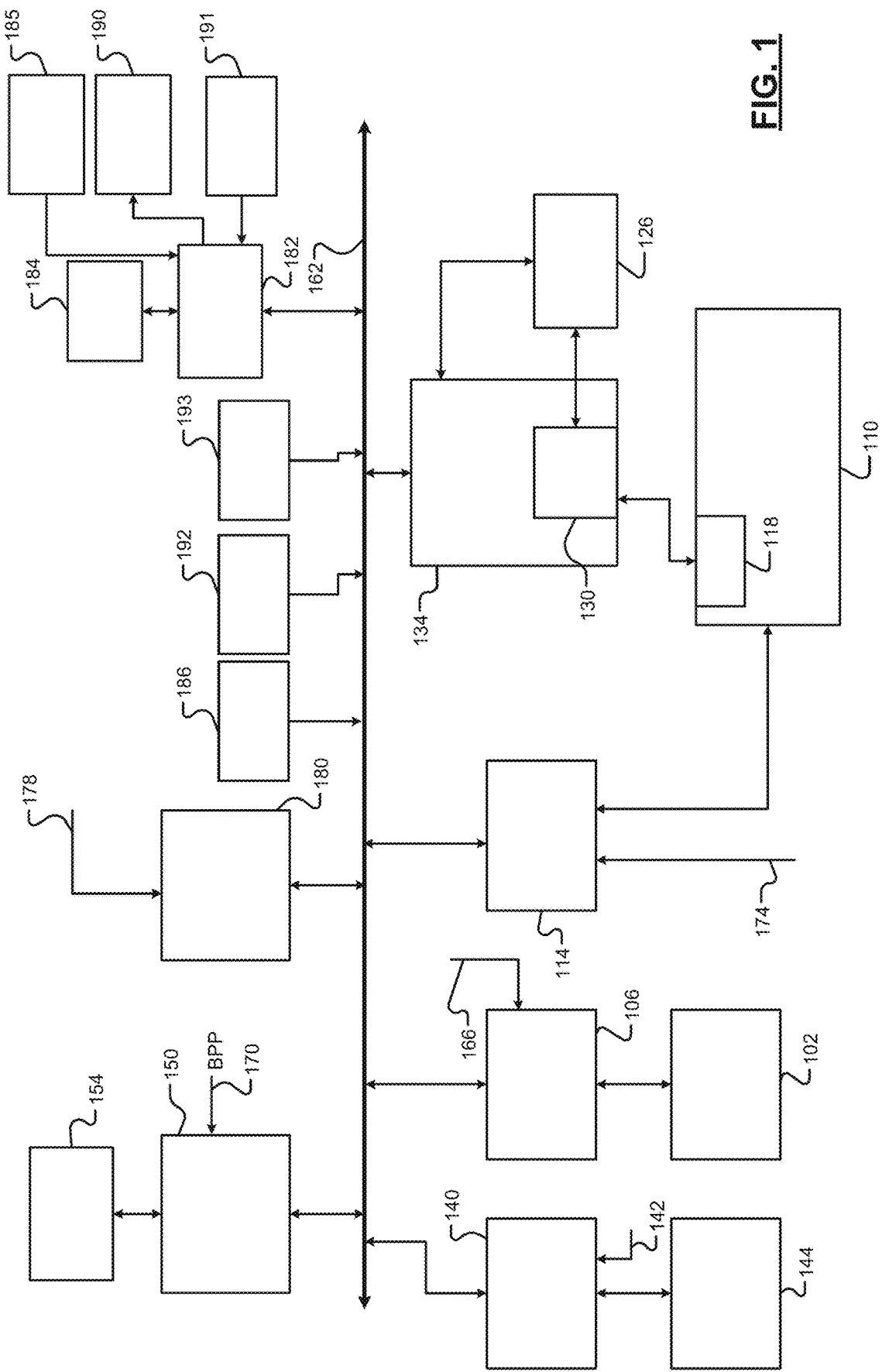
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as an inverter module in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. Modules of the vehicle may share parameters via a network 162, such as a controller area network (CAN) and/or another suitable type of network. The CAN may also be referred to as a car area network. The network 162 may include one or more data buses. Various parameters may be made available by a given control module to other control modules via the CAN 162.

The driver input may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system may include an infotainment module 182. The infotainment module 182 may control what is displayed on a display 184. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc.

The infotainment module 182 may receive input from a plurality of external sensors and cameras, generally illustrated in FIG. 1 by 186. For example, the infotainment module 182 may display video, various views, and/or alerts on the display 184 via input from the external sensors and cameras 186.

The infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the control modules shown and discussed.

Input from the external sensors and cameras 186 may also be used to control autonomous driving, determine complexities of intersections, and/or for one or more other uses.

A global positioning system (GPS) module 191 receives GPS data (e.g., a present location, such as coordinates) from a GPS system. A driver monitoring module 192 includes one or more devices configured to monitor one or more characteristics of a driver of the vehicle. For example, the driver monitoring module 192 may include one or more cameras configured to capture images of the driver and within a passenger cabin of the vehicle, for example, to determine a facial expression, one or more gestures, hand placement, and other driver information based on the images.

A V2X module 193 communicates with other vehicles via a vehicle to vehicle (V2V) communication protocol and/or with infrastructure via a vehicle to infrastructure (V2I) communication protocol. V2V communication and V2I communication can be more generally referred to as V2X communication. The V2X module 193 receives information from other vehicles and/or infrastructure from the other vehicles and/or infrastructure components.

Figure 2:
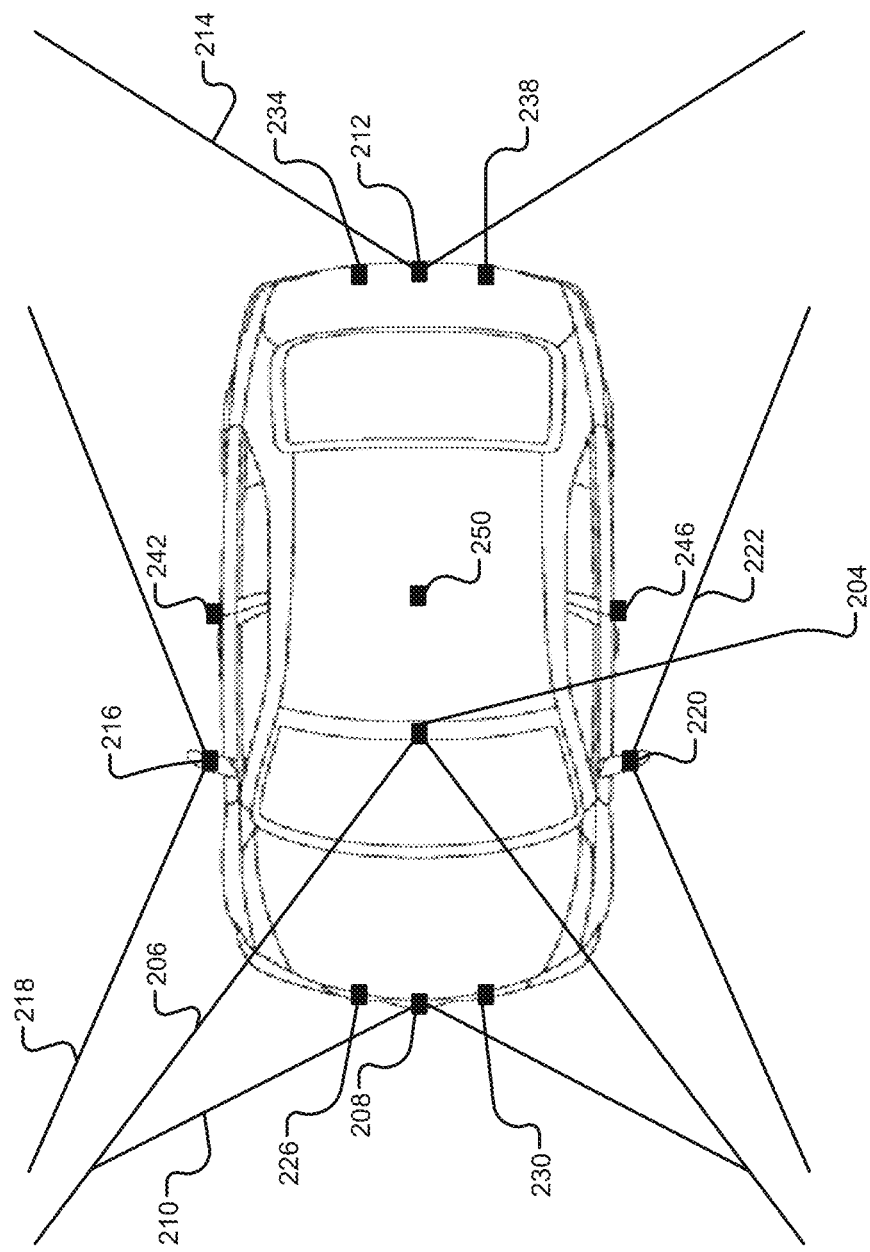
FIG. 2 is a functional block diagram of a vehicle including examples of external sensors and cameras.

Referring now to FIG. 2, a functional block diagram of a vehicle including examples of external sensors and cameras is presented. The external sensors and cameras 186 include various cameras positioned to capture images and video outside of (external to) the vehicle and various types of sensors measuring parameters outside of (external to) the vehicle. For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, such as with a rear view mirror within a windshield of the vehicle. The forward facing camera 204 may not be able to capture images and video of items within all of or at least a portion of the predetermined FOV of the front camera 208 and may capture images and video that is greater than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may capture images and video within a predetermined distance behind vehicle and may be located at the rear of the vehicle, such as near a rear license plate. A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located. A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 also include various other types of sensors, such as radar sensors, a light detection and ranging (LIDAR) sensor 250, etc. For example, the vehicle may include one or more forward facing radar sensors, such as forward facing radar sensors 226 and 230, one or more rearward facing radar sensors, such as rearward facing radar sensors 234 and 238. The vehicle may also include one or more right side radar sensors, such as right side radar sensor 242, and one or more left side radar sensors, such as left side radar sensor 246. The locations and fields of view of the cameras and radar sensors are provided as examples only and different locations and fields of view could be used. Radar sensors output radar signals around the vehicle. Objects around the vehicle can be detected based on input from the external sensors and cameras 186.

Figure 3:
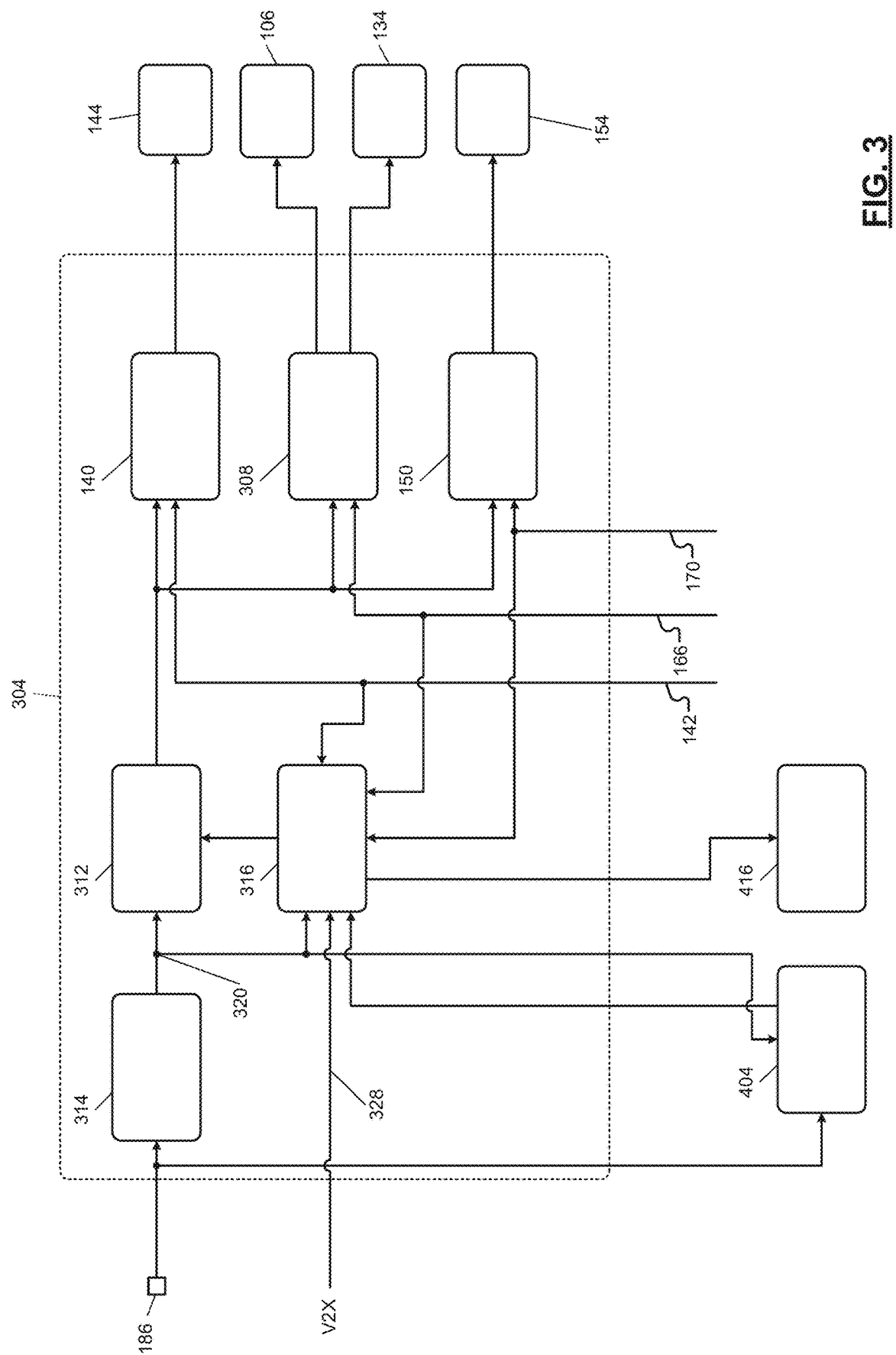
FIG. 3 is a functional block diagram of an example implementation of a driving module.

FIG. 3 includes a functional block diagram of an example implementation of a driving module 304. When autonomous driving is not being performed, as discussed above, the steering control module 140 controls steering of the vehicle based on the SWA 142, and the EBCM 150 controls braking based on the BPP 170. Additionally, an acceleration control module 308 controls acceleration and deceleration of the vehicle based on the APP 166 and/or one or more other inputs. The acceleration control module 308 may control acceleration and deceleration via at least one of the ECM 106 (controlling torque of the engine 102) and the TCM 114 (controlling torque of the electric motor 118).

An autonomous module 312 controls steering, acceleration and deceleration, and braking of the vehicle during autonomous driving of the vehicle. For example, a sensor fusion module 314 may fuse together data from the external cameras and sensors 186 and may detect features and objects around the vehicle based on input from the external cameras and sensors 186. The autonomous module 312 may control steering, acceleration, and deceleration based on the features and objects, such as to avoid any objects detected.

During autonomous driving, however, the steering control module 140 may override input from the autonomous module 312 and control steering based on the SWA 142. Additionally, the acceleration control module 308 may override input from the autonomous module 312 and control acceleration and deceleration based on the APP 166, and the EBCM 150 may override input from the autonomous module 312 and control braking based on the BPP 170.

A driving control module 316 controls whether autonomous driving is performed and, if autonomous driving is performed, a scope of the autonomous driving. The driving control module 316 may control whether autonomous driving is performed and, if autonomous driving is performed, for example, based on input 320 from the sensor fusion module 314 (generated based on input from the external cameras and sensors 186), input 324 from the driver monitoring module 192, V2X data 328 from the V2X module 193, and/or other data.

As discussed further below, complexity values for intersections, respectively, that the vehicle may encounter are determined. The complexity value for an intersection may correspond to a complexity of navigating the intersection during autonomous driving. The driving control module 316 may take one or more actions based on the complexity value of an intersection. For example, the driving control module 316 may adjust a route of the vehicle such that the vehicle will not encounter the intersection, reallocate existing computational resources (e.g., place more processing priority toward a direction of interest), allocate additional computational resources (e.g., processor cores, such as onboard processor cores or offboard/server processor cores) and/or additional sensing resources (e.g., adjusting sampling rate of one or more external cameras and/or sensors) to the sensor fusion module 314, trigger the sensor fusion module 314 to focus on one or more fields of view or areas around the vehicle, trigger remote driving of the vehicle by a remote driver, or prompt the driver of the vehicle to take over one or more aspects of driving to navigate the intersection. Other actions are also possible.

Figure 4:
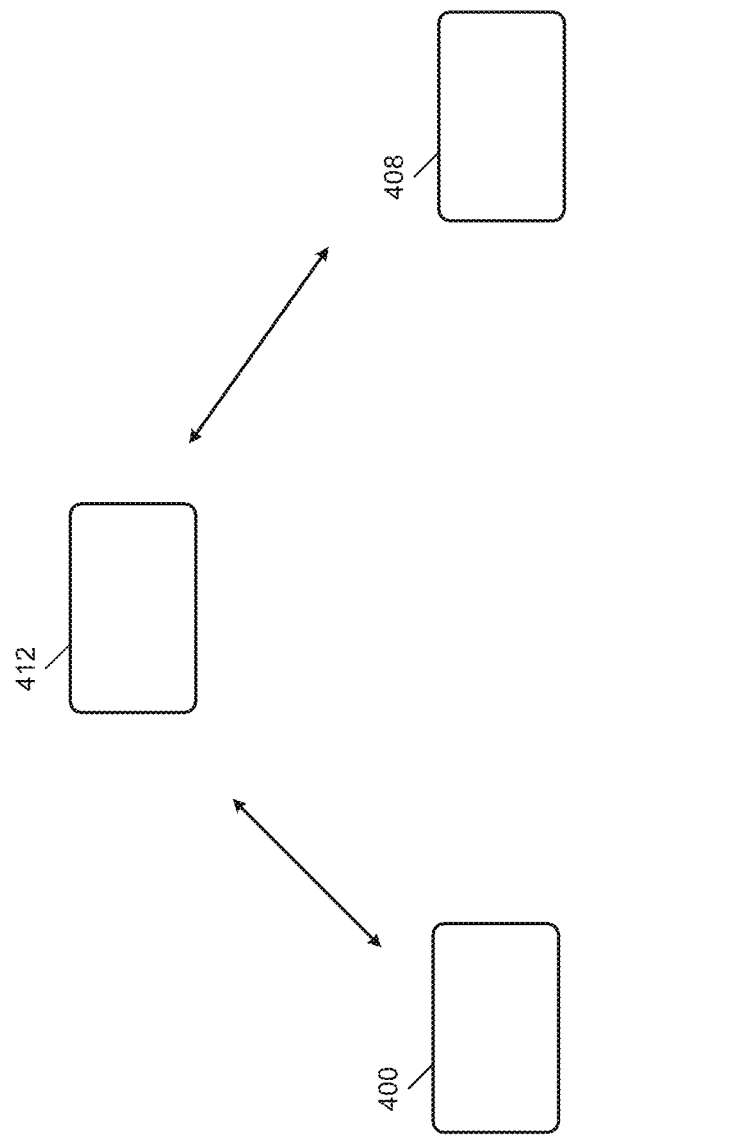
FIG. 4 is a functional block diagram of an example complexity system.

FIG. 4 is a functional block diagram of an example complexity system. The vehicle is illustrated by 400 in FIG. 4. The vehicle 400 includes a transceiver module 404 (FIG. 3) that communicates with a server 408 via a network 412, such as including the Internet. The vehicle 400 transmits various information to the server 408 for determination of the complexity values of one or more intersections, such as intersections in a present route of the vehicle 400 or a next intersection to be encountered by the vehicle 400. Examples of information that the vehicle 400 may transmit include information from the sensor fusion module 314, an identifier of the vehicle 400 (e.g., a vehicle identification number (VIN)), a present location and heading of the vehicle 400 (e.g., from the GPS module 191), and indicators of quality of various parameters of the vehicle (e.g., mapping, GPS services, wireless connections, etc.). Other parameters may also be transmitted to the server 408.

The server 408 determines a complexity value of an intersection based on the received information and other information, as discussed further below. The server 408 transmits the complexity value of the intersection back to the vehicle 400. The driving control module 316 takes one or more actions, as discussed above, based on the complexity value of the intersection.

As an example, complexity values may range from 0 for the least complex intersections to 100 for the most complex intersections. Other suitable values or indicators of complexity may be used. When the complexity value of the intersection is greater than a first predetermined value, the driving control module 316 may alter a route of the vehicle 400 such that the vehicle 400 will not travel through the intersection. When the complexity value of the intersection is greater than a second predetermined value that is less than the first predetermined value, the driving control module 316 may trigger remote driving or prompt the driver of the vehicle to take over control of the vehicle 400 to navigate the intersection and end autonomous driving. To prompt the driver to take over control of the vehicle 400, the driving control module 316 may generate one or more alerts via one or more driver output devices 416 (FIG. 3). For example, the driving control module 316 may output a visual indicator for the driver to take over control of the vehicle 400 via one or more visual indicators, such as the display 184. Additionally or alternatively, the driving control module 316 may output one or more audible indicators for the driver to take over control of the vehicle 400, such as via the speakers 190.

When the complexity value of the intersection is greater than a third predetermined value that is less than the second predetermined value, the driving control module 316 may reallocate existing computational resources (e.g., place more processing priority toward a direction of interest) allocate additional computational resources (e.g., processor cores, such as onboard/vehicle or offboard/server processor cores)) and/or additional sensing resources (e.g., adjusting sampling rate of one or more external cameras and/or sensors) to the sensor fusion module 314 and/or trigger the sensor fusion module 314 to focus on one or more fields of view or areas around the vehicle. When the complexity value of the intersection is less than the third predetermined value, the driving control module 316 may take no action and allow the autonomous module 312 to control navigation of the intersection based on the input.

Figure 5:
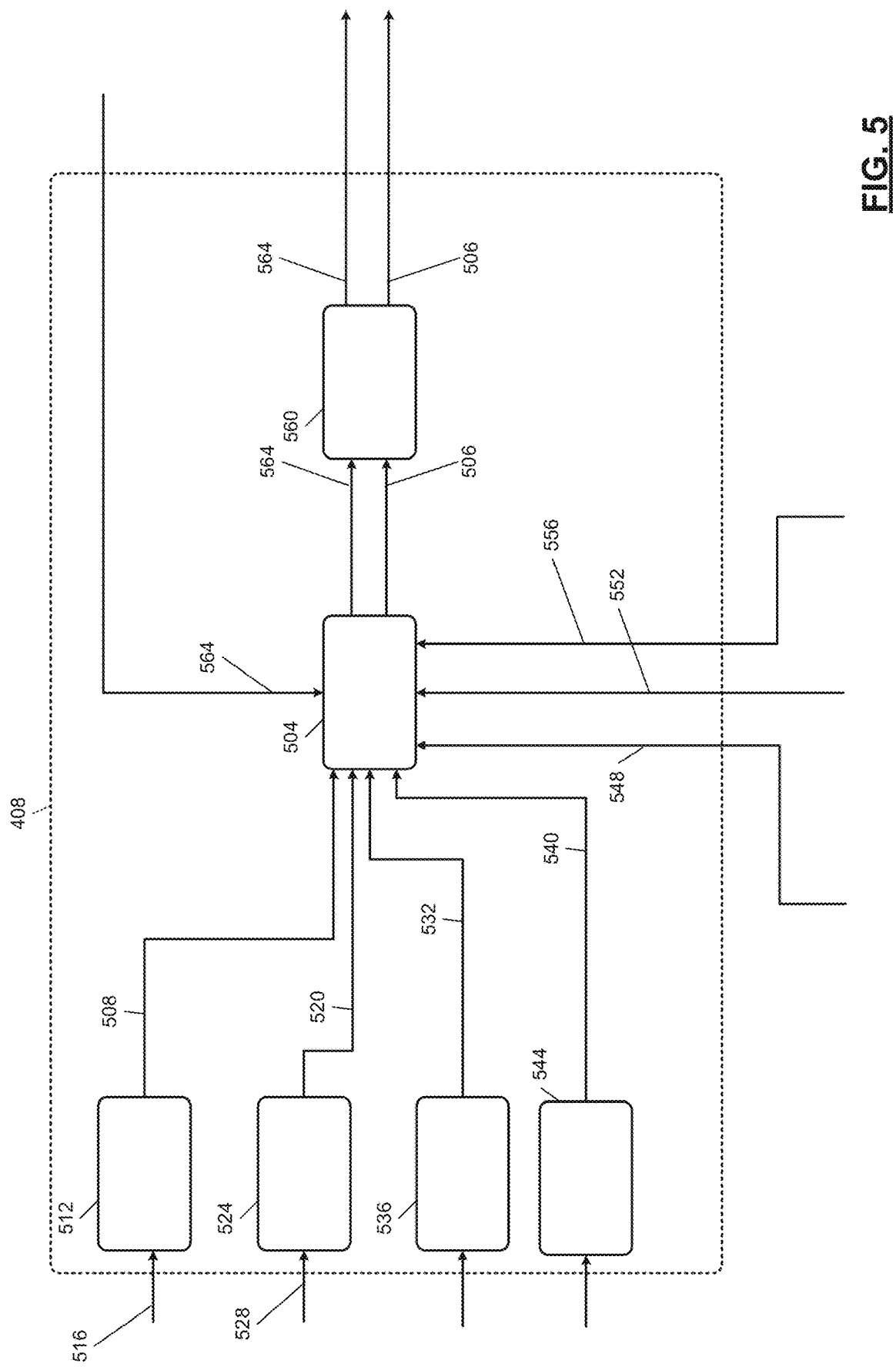
FIG. 5 is a functional block diagram of an example server.

FIG. 5 is a functional block diagram of an example implementation of the server 408. A complexity module 504 determines the complexity value 506 of an intersection based on various inputs. The complexity module 504 may determine the complexity value 506 of an intersection using one or more lookup tables and/or equations that relate the inputs to complexity values.

A first input includes sensing capabilities 508 of the vehicle 400. A capabilities module 512 determines the sensing capabilities 508 of the vehicle 400 based on a unique identifier (e.g., a VIN) 516 of the vehicle 400, such as transmitted by the vehicle 400. The sensing capabilities 508 may indicate which external cameras and/or sensors the vehicle 400 includes. For example, the sensing capabilities 508 may indicate that the vehicle 400 includes only one or more cameras or that the vehicle 400 includes one or more cameras and a LIDAR sensor, etc.

A second input includes how the vehicle 400 will interact 520 with the intersection. The interaction 520 may include, for example, whether the vehicle 400 will turn left, turn right, or proceed straight at the intersection and a direction (e.g., north, east, south, west) that the vehicle 400 will approach the intersection. An interaction module 524 may determine the interactions 520, for example, based on a location and a heading 528 of the vehicle 400, such as received from the vehicle 400. The interaction module 524 may determine the interactions 520 further based on a route of the vehicle 400, such as received from the vehicle 400 or determined by the server 408.

A third input includes historical data 532 regarding the intersection. The historical data 532 may include, for example, a number of accidents at the intersection within the last predetermined period, a frequency of accidents, and/or one or more other suitable parameters. A history module 536 may obtain the historical data 532 for the intersection from one or more remote data sources, such as a database maintained by the department of transportation (DOT) or another suitable database of accident events detected and maintained, for example, by a vehicle manufacturer.

A fourth input includes features data 540 of the intersection. The features data 540 of the intersection may include, for example, geometry of the intersection, topology of the intersection, an angle of intersection of roads at the intersection, and one or more other physical features of the intersection. A features module 544 may obtain the features data 540 for the intersection from one or more remote data sources, such as a database maintained by the DOT.

A fifth input includes complexity values 548 of the intersection from one or more other vehicles. The complexity values 548 may be received from the other vehicles, for example, using vehicle to vehicle (V2V) communication or another suitable type of communication.

A sixth input includes present weather conditions 552 at the intersection. The weather conditions 552 at the intersection may be obtained from a remote weather source (e.g., weather station data), such as based on a city, zipcode, or location of the intersection. Weather conditions may additionally or alternatively be obtained from aggregated connected vehicle, data, such as via V2X communication with other vehicles and/or infrastructure.

A seventh input includes present traffic conditions 556 at the intersection. The present traffic conditions 556 may include, for example, an indicator of whether one or more accidents are present at the intersection, whether construction is present at the intersection, an indicator of an amount of traffic at the intersection (e.g., low, medium, high, etc.), and/or other traffic information at the intersection. The traffic conditions 556 may be obtained, for example, from a traffic source, such as based on a location of the intersection.

While examples of inputs are provided, the complexity module 504 may determine the complexity value 506 of the intersection additionally or alternatively based on one or more other types of data. A transceiver module 560 transmits the complexity value 506 to the vehicle 400 via the network 412 for use by the vehicle 400 as discussed above. In the example of triggering remote driving, the vehicle 400 may transmit video (e.g., from one or more of the external cameras and sensors 186) to the remote driving source, the server 408 may transmit steering, acceleration, and braking commands to the vehicle 400 from the remote driving source. The autonomous module 312 controls steering, acceleration, and braking of the vehicle based on the steering, acceleration, and braking commands from the remote driving source.

Under some circumstances (e.g., when the complexity value 506 is within a predetermined range), the complexity module 504 may transmit video 564 from the intersection to the vehicle 400 via the transceiver module 560. The complexity module 504 may obtain the video 564 from the intersection, for example, from one or more traffic cameras at the intersection. The autonomous module 312 may use the video 564, for example, to navigate the intersection. Additionally or alternatively, the sensor fusion module 314 may include the video 564 in the fusion with the input from the external cameras and sensors 186.

As an example, the complexity module 504 may determine the complexity value 506 of an intersection using the equation:

$$r = \Sigma_{i=1}^{m} w_i p_i,$$

where r is the complexity value 506, m is the number of inputs, $w_i$ is a weight value for the i-th one of the m inputs, and $p_i$ is a complexity factor value of the i-th one of the m inputs. m is an integer greater than one. The complexity module 504 may determine the complexity factor values using the equation:

$$p_i = f(x1, x2, \ldots, xn),$$

where x1, x2, ..., xn are respective parameters for that complexity factor value. n is an integer greater than or equal to one. The function may be embodied as a lookup table or an equation, for example. The weight values ($w_i$) may be fixed predetermined values that are calibrated, for example, using machine learning or deep learning (e.g., regression). Alternatively, the weight values may be variable.

A first complexity factor value (p) may be based on intent and direction of approach to the intersection. The complexity module 504 may determine the first complexity factor as a function of input parameters such as: whether it is possible to turn left on green at the intersection, whether U-turns are allowed at the intersection, whether right turns on red are allowed at the intersection, and/or one or more other parameters. The complexity module 504 may determine the first complexity factor value using one or more functions and/or lookup tables that relate the input parameters to first complexity factor values.

A second complexity factor value (p) may be based on static factors. The complexity module 504 may determine the first complexity factor as a function of input parameters such as: a number of traffic lights at the intersection, location(s) of traffic light(s) at the intersection, a number of signs at the intersection, type(s) of the sign(s) at the intersection, a road layout (e.g., geometry) at the intersection, lane markings at the intersection, a width of lanes, a number of lanes, whether a roundabout is present, occlusions at the intersection, elevation changes at the intersection, road roughness at the intersection, objects impacting the performance of sensors (e.g., radar reflecting objects) at the intersection, flora/buildings at the intersections, whether one or more directions of traffic are stop sign controlled, whether stop bar markings are present, traffic impeding businesses at the intersection, and other parameters. The complexity module 504 may determine the second complexity factor value using one or more functions and/or lookup tables that relate the input parameters to second complexity factor values.

A third complexity factor value (p) may be based on semi-dynamic factors. The complexity module 504 may determine the third complexity factor value as a function of input parameters such as: typical traffic trends of the intersection, smoothness of the driver's control during maneuvers, road rules for the intersection, whether construction is present at the intersection, a history of accidents at the intersection, a quality of a map of the intersection, and other parameters. The complexity module 504 may determine the third complexity factor value using one or more functions and/or lookup tables that relate the input parameters to second complexity factor values.

A fourth complexity factor value (p) may be based on dynamic factors. The complexity module 504 may determine the fourth complexity factor value as a function of input parameters such as: characteristics of pedestrians, cyclists, and jaywalkers at the intersection, wireless connection quality at the intersection, lighting at the intersection, visibility at the intersection, variations around norms, ratio of non-autonomous to autonomous cars, and other parameters. The complexity module 504 may determine the fourth complexity factor value using one or more functions and/or lookup tables that relate the input parameters to second complexity factor values.

The complexity module 504 determines the complexity value 506 for the intersection based on the first, second, third, and fourth complexity factor values, as described above.

Figure 6:
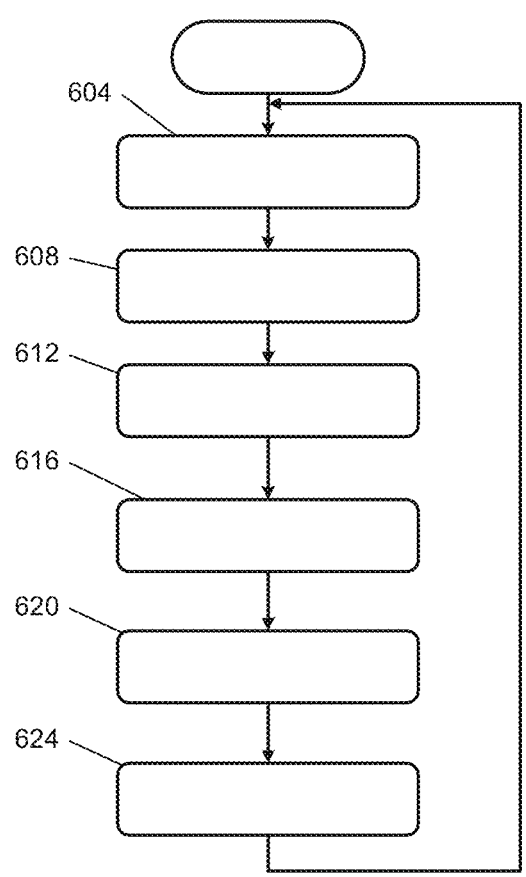
FIG. 6 is a flowchart depicting an example method of determining complexity values for intersections, respectively.

FIG. 6 is a flowchart depicting an example method of determining the complexity value 506 of an intersection. Control begins with 604 where the complexity module 504 determines the next intersection that the vehicle will encounter. The complexity module 504 may determine the next intersection, for example, based on the location of the vehicle and the heading of the vehicle.

At 608, the complexity module 504 receives the inputs for determining the complexity value 604 for the intersection. At 612, the complexity module 504 determines the complexity factor values for the intersection, as discussed above.

At 616, the complexity module 504 determines the weight values for the complexity factor values, such as from memory. At 620, the complexity module 504 determines the complexity value 506 based on the complexity value factors and the weight values, as discussed above. At 624, the complexity module 504 transmits the complexity value 506 to the vehicle 400 via the transceiver module 560.

Figure 7:
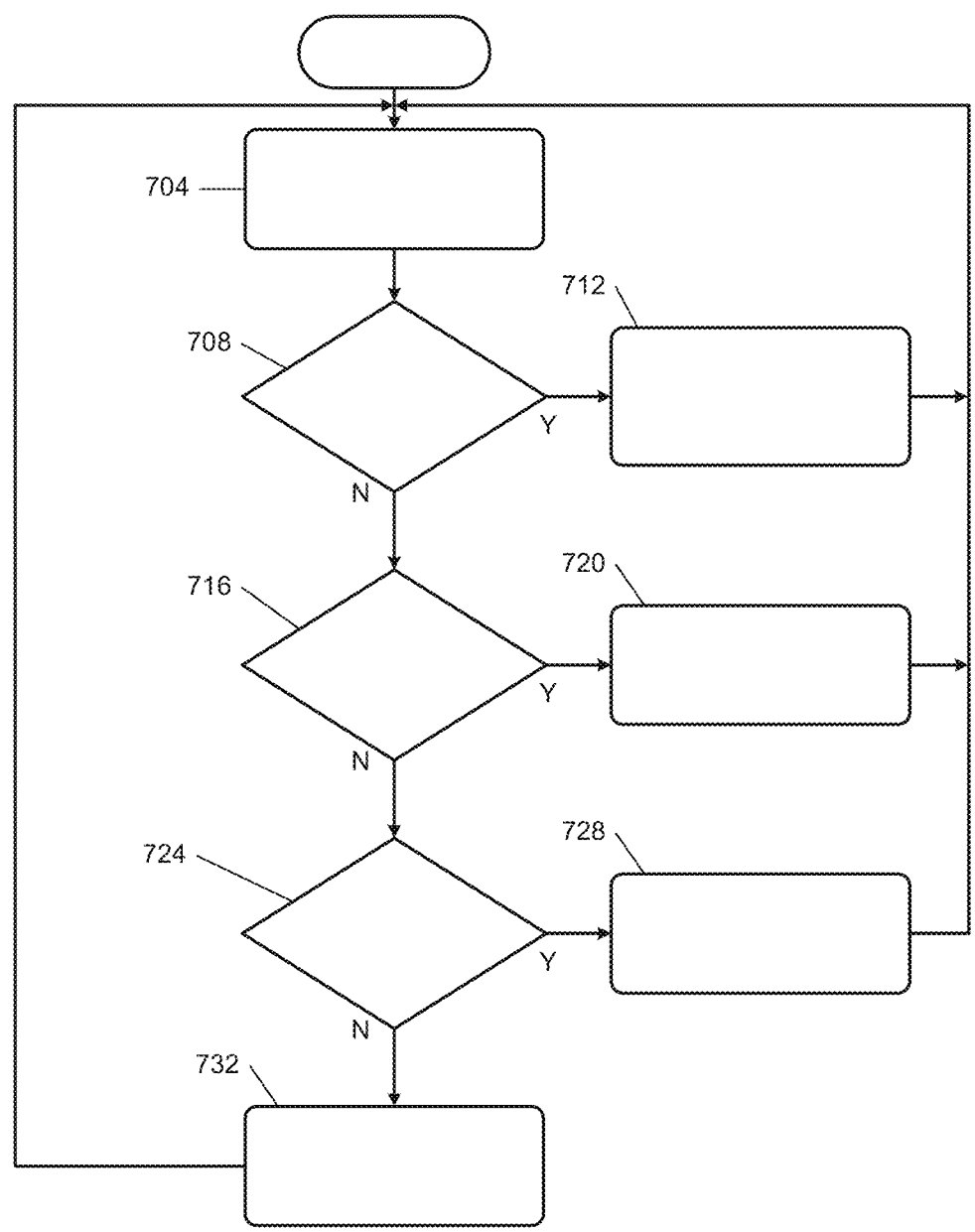
FIG. 7 is a flowchart depicting an example method of vehicle control based on intersection complexity.

FIG. 7 is a flowchart depicting an example method of vehicle control based on complexity of an intersection. While an example order and arrangement of predetermined values is provided, predetermined values of different relationships and/or a different order may be used.

Control may begin with 704 where the driving control module 316 receives the complexity value 506 for the intersection. At 708, the driving control module 316 may determine whether the complexity value is greater than a first predetermined value. If 708 is true, the driving control module 316 may change the present route of the vehicle such that the vehicle will not travel through the intersection (and avoid the intersection) at 712, and control may return to 704. If 708 is false, control may continue with 716.

At 716, the driving control module 316 may determine whether the complexity value 506 is greater than a second predetermined value. If 716 is true, the driving control module 316 may trigger the driver to take over control of the vehicle (and disable autonomous driving once the driver has taken over control) at 720. Alternatively, the driving control module 316 may trigger remote driving of the vehicle at 720. If 716 is false, control may continue with 724.

At 724, the driving control module 316 may determine whether the complexity value 506 is greater than a third predetermined value. If 724 is true, the driving control module 316 may adjust one or more aspects of the sensor fusion performed by the sensor fusion module 314 at 728. For example, the sensor fusion module 314 may focus on one or more areas or aspects of the intersection. The driving control module 316 may continue autonomous driving. If 724 is false, the driving control module 316 may continue autonomous driving at 732.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An intersection navigation system comprising:
    a capabilities module configured to determine sensing capabilities of a vehicle based on a vehicle identification number (VIN) of the vehicle, wherein the sensing capabilities include numbers and types of external cameras and sensors of the vehicle;
    a complexity module configured to determine a complexity value for an intersection of two or more roads based on the sensing capabilities of the vehicle,
    wherein the complexity value for the intersection corresponds to a level of complexity for the vehicle to navigate the intersection during autonomous driving; and
    a driving control module configured to:
        during autonomous driving of the vehicle, control at least one of:
            steering of the vehicle;
            braking of the vehicle; and
            acceleration of the vehicle; and
        based on the complexity value of the intersection, selectively adjust at least one aspect of the autonomous driving.

2. The intersection navigation system of claim 1 wherein the driving control module is configured to, based on the complexity value of the intersection, selectively adjust a route of the vehicle.

3. The intersection navigation system of claim 2 wherein the driving control module is configured to, when the complexity value of the intersection is greater than a predetermined value, remove the intersection from the route.

4. The intersection navigation system of claim 1 wherein the driving control module is configured to, based on the complexity value of the intersection, selectively disable the autonomous driving and trigger manual driving by a driver of the vehicle.

5. The intersection navigation system of claim 4 wherein the driving control module is configured to, when the complexity value of the intersection is greater than a predetermined value, selectively disable the autonomous driving and trigger manual driving by the driver of the vehicle.

6. The intersection navigation system of claim 1 wherein the driving control module is configured to, based on the complexity value of the intersection, selectively disable the autonomous driving and trigger driving of the vehicle by a driver that is remote from the vehicle.

7. The intersection navigation system of claim 6 wherein the driving control module is configured to, when the complexity value of the intersection is greater than a predetermined value, selectively disable the autonomous driving and trigger driving of the vehicle by the driver that is remote from the vehicle.

8. The intersection navigation system of claim 1 wherein the driving control module is configured to, based on the complexity value of the intersection, adjust at least one aspect of sensor fusion.

9. The intersection navigation system of claim 8 wherein the driving control module is configured to, when the complexity value of the intersection is greater than a predetermined value, adjust at least one aspect of the sensor fusion.

10. The intersection navigation system of claim 1 wherein the complexity module is configured to determine the complexity value of the intersection based on whether the vehicle will proceed straight through the intersection, turn right at the intersection, or turn left at the intersection.

11. The intersection navigation system of claim 1 wherein the complexity module is configured to determine the complexity value of the intersection based on historical data for accidents at the intersection.

12. The intersection navigation system of claim 11 wherein the historical data for accidents at the intersection includes a number of accidents at the intersection within a predetermined period.

13. The intersection navigation system of claim 1 wherein the complexity module is configured to determine the complexity value of the intersection based on a geographical feature of the intersection.

14. The intersection navigation system of claim 13 wherein the complexity module is configured to determine the complexity value of the intersection based on topography of the intersection.

15. The intersection navigation system of claim 1 wherein the complexity module is configured to determine the complexity value of the intersection based on a second complexity value of the intersection received from a second vehicle.

16. The intersection navigation system of claim 1 wherein the complexity module is configured to determine the complexity value of the intersection based on present weather at the intersection.

17. The intersection navigation system of claim 1 wherein the complexity module is configured to determine the complexity value of the intersection based on present traffic at the intersection.

18. The intersection navigation system of claim 1 wherein the complexity module is configured to determine the complexity value for the intersection based on (a) a plurality of complexity factor values of a plurality of inputs, respectively, respectively multiplied with (b) a plurality of weight values associated with the plurality of inputs, respectively.

19. The intersection navigation system of claim 18 wherein the complexity module is configured to:
- determine a first one of the complexity factor values based on an intent and a direction of approach to the intersection;
- determine a second one of the complexity factor values based on static factors;
- determine a third one of the complexity factor values based on semi-dynamic factors; and
- determine a fourth one of the complexity factor values based on dynamic factors.

20. An intersection navigation method comprising:
- determining sensing capabilities of a vehicle based on a vehicle identification number (VIN) of the vehicle, wherein the sensing capabilities include numbers and types of external cameras and sensors of the vehicle;
- determining a complexity value for an intersection of two or more roads based on the sensing capabilities of the vehicle,
- wherein the complexity value for the intersection corresponds to a level of complexity for the vehicle to navigate the intersection during autonomous driving;
- during autonomous driving of the vehicle, controlling at least one of:
  - steering of the vehicle;
  - braking of the vehicle; and
  - acceleration of the vehicle; and
- based on the complexity value of the intersection, selectively adjusting at least one aspect of the autonomous driving.

* * * * *